(12) United States Patent
Jensen

(10) Patent No.: US 8,485,786 B2
(45) Date of Patent: Jul. 16, 2013

(54) REINFORCED BLADE FOR WIND TURBINE

(75) Inventor: Find Mølholt Jensen, Viby Sjœlland (DK)

(73) Assignee: Bladena ApS, Ringsted (DK)

( * ) Notice: Subject to any disclaimer, the term of this patent is extended or adjusted under 35 U.S.C. 154(b) by 827 days.

(21) Appl. No.: 12/448,912

(22) PCT Filed: Jan. 16, 2008

(86) PCT No.: PCT/DK2008/000017
§ 371 (c)(1),
(2), (4) Date: Sep. 14, 2009

(87) PCT Pub. No.: WO2008/086805
PCT Pub. Date: Jul. 24, 2008

(65) Prior Publication Data
US 2010/0008789 A1    Jan. 14, 2010

(30) Foreign Application Priority Data
Jan. 16, 2007  (DK) .................................. 2007 00065

(51) Int. Cl.
*B63H 1/26* (2006.01)

(52) U.S. Cl.
USPC ...................................... 416/233; 416/227 R

(58) Field of Classification Search
USPC .............. 416/232, 233, 239, 240, 227 R, 225
See application file for complete search history.

(56) References Cited

U.S. PATENT DOCUMENTS

| | | | |
|---|---|---|---|
| 4,295,790 A | 10/1981 | Eggert, Jr. | |
| 4,305,699 A | 12/1981 | Martinelli | |
| 4,339,230 A * | 7/1982 | Hill | 416/226 |
| 4,494,910 A | 1/1985 | Hahn et al. | |
| 4,643,646 A | 2/1987 | Hahn et al. | |
| 4,976,587 A | 12/1990 | Johnston et al. | |
| 5,375,324 A | 12/1994 | Wallace et al. | |
| 5,401,138 A | 3/1995 | Mosiewicz | |
| 5,534,354 A | 7/1996 | Gregg et al. | |
| 6,457,943 B1 | 10/2002 | Olsen et al. | |
| 7,179,059 B2 | 2/2007 | Sorensen et al. | |
| 7,198,471 B2 | 4/2007 | Gunneskov et al. | |

(Continued)

FOREIGN PATENT DOCUMENTS

| | | |
|---|---|---|
| CA | 1151072 | 7/1981 |
| CN | 101029629 A | 9/2007 |

(Continued)

OTHER PUBLICATIONS

Jensen; Ultimate strength of a large wind turbine blade; Riso National Laboratory for Sustainable Energy; May 2008; pp. 1-313; Riso-PhD-34(EN); ISBN 978-87-550-3634-5, DTU BYG R-205-ISBN=9788778772831; Technical University of Denmark; Roskilde & Kgs. Lyngby, Denmark.

(Continued)

*Primary Examiner* — Dwayne J White
(74) *Attorney, Agent, or Firm* — Lee & Morse, P.C.

(57) ABSTRACT

The present invention relates to a reinforced blade for a wind turbine, and in particular to a wind turbine blade comprising a shell having a section with an aerodynamic profile, and at least one internal reinforcing floor connected inside the shell and extending substantially along the profile chord in order to increase the strength of the blade and to prevent or reduce deformations of the surface of the blade caused by edgewise and flapwise loading of the blade structure.

20 Claims, 18 Drawing Sheets

U.S. PATENT DOCUMENTS

Figure 1:
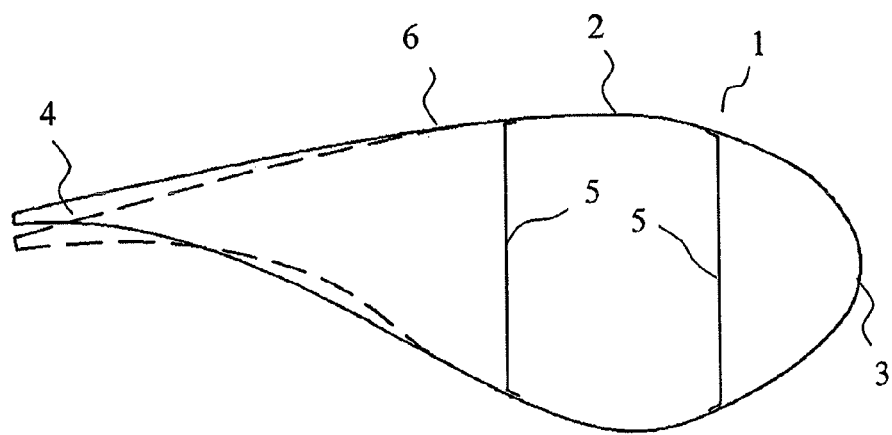

| | | | |
|---|---|---|---|
| 7,901,188 | B2 | 3/2011 | Llorente Gonzalez et al. |
| 2003/0116262 | A1 | 6/2003 | Stiesdal et al. |
| 2006/0175731 | A1 | 8/2006 | Bech et al. |
| 2007/0040294 | A1 | 2/2007 | Arelt |
| 2007/0110584 | A1 | 5/2007 | Stommel |
| 2007/0110585 | A1 | 5/2007 | Bonnet |
| 2007/0140861 | A1 | 6/2007 | Wobben |
| 2007/0189903 | A1 | 8/2007 | Eyb |
| 2007/0217918 | A1 | 9/2007 | Baker et al. |
| 2008/0069699 | A1 | 3/2008 | Bech |
| 2008/0304971 | A1 | 12/2008 | Liebmann |
| 2008/0310964 | A1 | 12/2008 | Llorente Gonzalez et al. |
| 2009/0208341 | A1 | 8/2009 | Llorente Gonzalez et al. |
| 2009/0324412 | A1 | 12/2009 | Roorda |
| 2010/0062238 | A1 | 3/2010 | Doyle et al. |
| 2010/0092300 | A1 | 4/2010 | Jensen et al. |

FOREIGN PATENT DOCUMENTS

| | | | |
|---|---|---|---|
| DE | 2923463 | A1 | 12/1980 |
| DE | 3037677 | A1 | 5/1982 |
| DE | 4225599 | A1 | 2/1994 |
| DE | 4428730 | A1 | 2/1996 |
| DE | 20320714 | U1 | 2/2005 |
| EP | 0061567 | A2 | 2/1982 |
| EP | 0062737 | A1 | 2/1982 |
| EP | 0258926 | A1 | 3/1988 |
| EP | 0391702 | A1 | 10/1990 |
| EP | 1184566 | A1 | 3/2002 |
| EP | 1310351 | A1 | 5/2003 |
| EP | 1522724 | A1 | 4/2005 |
| EP | 1584817 | A1 | 10/2005 |
| EP | 1754589 | A1 | 2/2007 |
| EP | 1785621 | A2 | 5/2007 |
| EP | 1808598 | A1 | 7/2007 |
| EP | 1878915 | A2 | 1/2008 |
| EP | 1880833 | A1 | 1/2008 |
| FR | 568874 | A | 4/1924 |
| FR | 701140 | A | 3/1931 |
| FR | 703261 | A | 4/1931 |
| FR | 2286953 | A1 | 4/1976 |
| FR | 2459381 | A1 | 1/1981 |
| FR | 2898865 | A1 | 9/2007 |
| GB | 319299 | | 9/1929 |
| GB | 909004 | | 10/1962 |
| GB | 2042093 | A | 9/1980 |
| GB | 2062120 | A | 5/1981 |
| GB | 2115075 | A | 9/1983 |
| JP | 61-192866 | A | 8/1986 |
| JP | 62-282176 | A | 12/1987 |
| JP | 2003-214322 | A | 7/2003 |
| JP | 2003-293937 | A | 10/2003 |
| NL | 9100816 | A | 12/1992 |
| WO | WO 00/14405 | | 3/2000 |
| WO | WO 01/46582 | A2 | 6/2001 |
| WO | WO 01/46582 | A3 | 6/2001 |
| WO | WO 01/98653 | A1 | 12/2001 |
| WO | WO 03/008800 | A1 | 1/2003 |
| WO | WO 03/087572 | A1 | 10/2003 |
| WO | WO 2004/078442 | A1 | 9/2004 |
| WO | WO 2005/011964 | A1 | 2/2005 |
| WO | WO 2006/002621 | A1 | 1/2006 |
| WO | WO 2006/066593 | A1 | 6/2006 |
| WO | WO 2006/103307 | A2 | 10/2006 |
| WO | WO 2008/086805 | A1 | 7/2008 |
| WO | WO 2008/089765 | A2 | 7/2008 |
| WO | WO 2008/089765 | A3 | 7/2008 |

OTHER PUBLICATIONS

Jensen, et al.; Full Scale Test of a SSP 34m box girder 1.Data Report; Riso National Laboratory for Sustainable Energy; Mar. 2008; pp. 1-77; Riso-R-1622 (EN); Technical University of Denmark; Roskilde, Denmark.

Jensen, et al.; Full Scale Test of a SSP 34m box girder 1.Data Report; Appendix E; Riso National Laboratory for Sustainable Energy; Mar. 2008; pp. 78-150; Riso-R-1622 (EN); Technical University of Denmark; Roskilde, Denmark.

Jensen, et al.; Full Scale Test of a SSP 34m box girder 2. Data Report; Riso National Laboratory for Sustainable Energy; May 2008; pp. 1-159; Riso-R-1588 (EN); Technical University of Denmark; Roskilde, Denmark.

Nielsen; Experimental and numerical analysis of a wind turbine blade cross section under lateral load conditions; pp. 1-44; Dec. 20, 2006.

Jensen, et al.; Structural testing and numerical simulation of a 34 m composite wind turbine blade; Composite Structures; Jul. 2006; pp. 52-61; vol. 76; Elsevier.

Technical Survey Report 162778; PRV InterPat; Dec. 27, 2007; pp. 1-3; Stockholm, Sweden.

Technical Survey Report; 162779; PRV InterPat; Dec. 27, 2007; pp. 1-4; Stockholm, Sweden.

Technical Survey Report; 162780; PRV InterPat; Dec. 27, 2007; pp. 1-4 Stockholm, Sweden.

PCT International Search Report in DK 2008/00861, dated Feb. 20, 2009 (Jensen).

PCT International Search Report in DK 2008/00867, dated Feb. 24, 2009 (Jensen).

PCT International Search Report in 2008/0921, dated Mar. 24, 2009 (Jensen).

Chinese Office action dated Jan. 7, 2013 for related application CN 200980124196.2.

* cited by examiner

REINFORCED BLADE FOR WIND TURBINE

The present invention relates to a reinforced blade for a wind turbine, and in particular to a wind turbine blade comprising a shell having a section with an aerodynamic profile, and at least one internal reinforcing floor connected inside the shell and extending substantially along the profile chord in order to increase the strength of the blade and to prevent or reduce deformations of the surface of the blade caused by edgewise and flapwise loading of the blade structure.

A wind turbine blade normally consists of an aerodynamic shell and an internal girder such as a beam or a spar, the girder can be a single beam, but often two girders are used, and along with the shell the girders can be said to form a box profile. The aerodynamic shell typically comprises a laminate of fibre reinforced plastics, fibreglass and/or other materials.

The section(s) of the aerodynamic shell where the internal girders are placed is/are usually reinforced in some way and is/are consequently often quite thick. The other part(s) or section(s) of the aerodynamic shell is typically only a thin skin or a laminate such as a sandwich construction with thin skins and a core material. A blade is typically provided by gluing or bonding or otherwise connecting two shell parts to each other.

In operation, the blade is subject to flapwise, edgewise and torsional loads. By flapwise direction is meant a direction substantially perpendicular to a transverse axis through a cross-section of the widest side of the blade. Alternatively, the flapwise direction may be construed as the direction (or the opposite direction) in which the aerodynamic lift acts on the profile. The edgewise direction is perpendicular to the flapwise direction. The edgewise loads, even though typically smaller than the flapwise loads, can potentially cause damage to the blade, especially fatigue damage and ultimately lead to failure of the blade.

When a blade is subjected to edgewise loading the section of the shell between a trailing edge of the blade and the internal girder is deforming out of the plane of the "neutral" (or initial) plane of the surface, see FIG. 1. This deformation induces peeling stresses in the trailing edge of the blade and consequently this can lead to a fatigue failure in the adhesive joint of the trailing edge where the two shell parts are connected to each other. This may then ultimately cause the blade to break apart. Furthermore, the aerodynamic efficiency of the blade is also compromised since the designed shape of the blade profile is no longer maintained.

Figure 2:
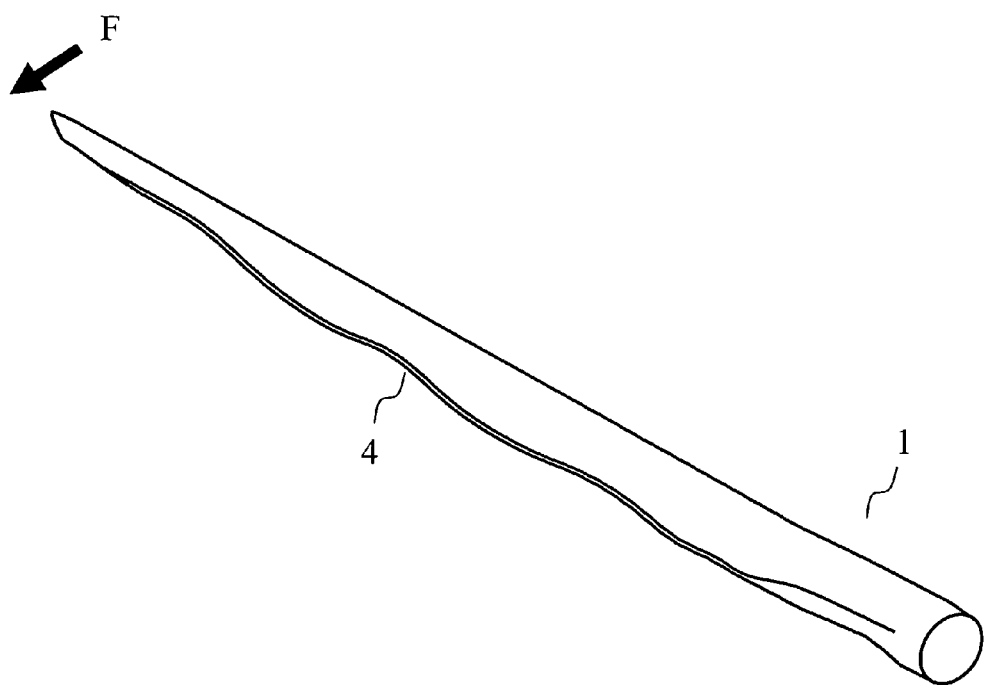

The edgewise loads can further cause the trailing edge of the blade to deform in a stable post buckling pattern, see FIG. 2. This is caused by bending of the blade from the leading edge towards the trailing edge. The blade material in the leading edge is then subject to tension and the trailing edge to compression. As the trailing edge is relative thin, it cannot withstand substantial compression forces before it bends out of its neutral plane. When this happens, some of the load on the trailing edge is transferred to and distributed through part of the shell further away from the trailing edge, until equilibrium of the forces is established. Although this deformation does not immediately lead to failure, it decreases the safety margin for the general failure load of the blade and also increases the peeling and shear stresses in the trailing edge.

Furthermore, the edgewise loads can induce compression forces in a leading edge section of the blade, and therefore a sandwich construction is often provided in the leading edge to increase the resistance against buckling, i.e. preventing the section's surface from bulging out of its plane.

Subjected to flapwise loads, the section of the aerodynamic shell between the trailing edge and the internal girder is deforming out of the plane of the surface's "neutral" position in a similar way as described above for the edgewise loads. This deformation also induces shear and peeling stresses in the trailing edge of the blade. The section will deform into a state of "lowest energy level", i.e. a situation wherein as much as possible of the stress in the blade is distributed to other sections of the blade. When part of the shell deform in this manner, it is usually referred to as an "ineffective panel". The distribution of the stresses to other parts of the blade means that these parts are subjected to at higher load. This will result in a larger tip deflection of the blade. Furthermore, the deformations of the blade's surface compromise the aerodynamic efficiency of the blade, because the designed shape of the profile is no longer maintained.

Under flapwise loading, crushing pressure (see FIG. 3) occur on the box profile of the blade due to its longitudinal curvature. This effect is often referred to as ovalization (reference is made to the article "Structural testing and numerical simulation of a 34 m composite wind turbine blade" by F. M. Jensen et. al. published by Elsevier in Composite Structures 76 (2006) 52-61). The crushing pressure loads the internal girder in compression (see FIG. 4). The flapwise loads also induce in-plane shear forces in the internal girder. During the operation of the blade, transverse shear forces occur in the blade as shown on a cross-section of the blade (see FIG. 5). The shear forces are generated by the flapwise and edgewise loads because the blade has asymmetric geometry and material distribution. The transverse shear forces distort the profile as shown on FIG. 5. The distortion of the profile reduces the blade's resistance to the crushing pressure and can cause a sudden collapse of the blade.

Presently, there is thus a need for a wind turbine blade in which deformations of the shell are prevented or minimised and wherein the blade structure is strengthened without increasing the overall weight. It is also desirable to provide improvements of a blade with at least one internal girder leading to increased resistance against buckling from crushing pressure and in-plane shear in order to carry the loads in the blade.

It is therefore an object of the present invention to provide a wind turbine blade with improved resistance against deformations of the shell.

It is yet another object of the present invention to provide a wind turbine blade with increased overall strength and overall stiffness.

It is another object of the present invention to provide a wind turbine blade with reduced weight.

It is also an object of the present invention to provide a wind turbine blade with improved reliability of joints between shell parts.

It is another object of the present invention to provide a wind turbine blade with an improved transferal of forces in the transition between the blade and the circular root.

It is yet another object of the present invention to provide a wind turbine blade that can be produced at a reduced manufacturing cost compared to the existing solutions.

It is still another object of the present invention to provide a wind turbine blade with an increased resistance against crushing pressure.

It is a further object to provide a wind turbine blade capable of working under severe aerodynamic loads and to optimise the aerodynamic efficiency, e.g. energy output of the blade.

It is another object to provide a wind turbine blade wherein the dynamic inertia loads the blade is applying on the other structural parts of the wind turbine construction are reduced.

It is further an object of the present invention to provide alternatives to the prior art.

In particular, it may be seen as an object of the present invention to provide a wind turbine blade that solves the above mentioned problems of the prior art by providing the blade with a reinforcing floor e.g. such as described by way of the examples in the following disclosure.

According to a first aspect of the present invention, the above-mentioned and other objects are fulfilled by a wind turbine blade comprising a shell having a section with an aerodynamic profile, and at least one internal reinforcing floor connected inside the shell for increasing the strength of the blade and having a cross section transversely to the longitudinal extension of the blade that extends substantially in a direction from the trailing edge to the leading edge of the blade.

According to a second aspect of the invention, the above-mentioned and other objects are fulfilled by a method of increasing the strength of a wind turbine blade having a shell with a section having an aerodynamic profile, wherein the method comprises the step of positioning and connecting at least one internal reinforcing floor inside the shell for extension substantially in a direction from the trailing edge to the leading edge of the blade.

The wind turbine blade may for example have a at least one internal reinforcing floor connected to an inner surface of the shell at the trailing edge of the blade and to an inner surface of the shell at the leading edge of the blade in order to prevent or reduce deformations of the surface of the blade, in particular deformations caused by edgewise loading of the blade structure.

The wind turbine blade may further have at least one internal girder, and at least one internal reinforcing floor connected to an inner surface of the shell and to the internal girder.

The connection(s) between the internal girder and the inner surface of the facing may be placed at any suitable position on the parts. Preferably, but not exclusively, the connections may be adapted in one or more points, along one or more lines or in any kind of spatial configuration. Furthermore, the connections may comprise any suitable kind of mechanical joint such as a welded, glued, melted, fused or other simple mechanical connection.

The profile chord of the blade is an imaginary surface that contains the leading edge and the trailing edge of the blade and extends therebetween. Thus, in accordance with the present invention, an internal reinforcing floor extends along, or substantially along, the profile chord of the blade. Thus, a connection between one of the at least one internal reinforcing floor and a respective one of the at least one internal girder is preferably located with a shortest distance to the shell that is larger than 0.16 times, more preferred larger than 0.33 times, the total distance between the upper part of the shell and the lower part of the shell along a transversal extension of the respective girder at the connection. For example, the connection may be located halfway or approximately halfway between the upper part of the shell and the lower part of the shell along a transversal extension of the respective girder at the connection.

The at least one internal girder may comprise a box girder or a box beam. The sides of the box girder may vary in thickness in its longitudinal and/or transverse direction(s) and the shape and/or the perimeter length of the cross-section of the girder may also vary along its longitudinal extent.

Preferably, the box girder or box beam is of a substantially polygonal cross-section. The cross-section of the box girder or box beam may have any polygonal shape such as substantially rectangular, triangular, circular, oval, elliptical etc. but is preferably rectangular or substantially square.

The shell of the blade may preferably, but not exclusively, comprise a composite or laminated material. The material may preferably, but not exclusively, comprise fibreglass and/or carbon fibres and/or other durable and flexible materials typically with a high strength/weight ratio such as other fibre reinforced plastic materials. This may further comprise, at least in part, light-weight metals or alloys. The shell may typically be a laminate or sandwich-construction. The thickness of the shell may vary along its length and/or width.

In an embodiment of the invention, at least one girder is provided to primarily strengthen and/or reinforce the blade in its longitudinal direction and may also be referred to as a web. In this application the girder or web should be construed as any kind of elongate constructional element capable of taking up loads, such as a beam or a spar e.g. shaped as an I-profile preferably made from fibre reinforced plastics or other suitable material. The web may substantially extend through the length of the blade. However, it may also be preferred to provide the blade with two or more separated webs in the longitudinal direction of the blade, especially for facilitating handling or transporting purposes. In principle, any number of webs may be applied, however for the sake of simplicity and for keeping the overall weight of the blade as low as possible a number of one or two webs is/are preferred. Preferably, in a direction perpendicular to its longitudinal extension, each girder or web of the at least one internal girder extends from the lower part of the shell to the upper part of the shell in a substantially flapwise direction and is connected to the upper part and lower part, respectively, of the shell. Thus, in embodiments with a plurality of girders or webs, the shell interconnects the girders or webs.

The at least one internal reinforcing floor may be connected to the inner surface of the shell and to the at least one web. The connection on the inner surface of the shell and on the web may in principle be positioned anywhere thereon, but it should be observed that the chosen positioning causes the reinforcing floor to be able to provide a reasonable and useful reinforcing effect in the blade. The connection of a reinforcing floor between connecting points on the inner surface of the shell and the web prevents or minimises the problematic deformations described above. The connections may comprise any suitable kind of joint such as welded, glued, melted, fused or other simple mechanical connections such as bolt-and-nut connections. The reinforcing floor itself may comprise the connections or it may comprise additional connections or connection parts adapted to engage or cooperate with the other connections.

In embodiments the at least one internal reinforcing floor is connected to the inner surface of the shell in or in the vicinity of a trailing edge part and/or a leading edge part of the profile. The trailing and leading edge parts are indicated and illustrated in the figures.

In an embodiment with at least one internal girder, a reinforcing floor may be provided between the trailing edge and the at least one internal girder. If more than one internal girder is provided, the reinforcing floor may be provided between the trailing edge and the internal girder or web closest to the trailing edge. A reinforcing floor may of course also or instead be provided between the leading edge and the at least one internal girder. If more than one internal girder is provided the reinforcing floor may be provided between the leading edge and the internal girder or web closest to the leading edge. Reinforcing floors may of course also be provided between both the trailing and the leading edges and the one or (respectively closest) more internal girders. The one or more internal girder(s) may also comprise one or more divided or cut webs that are connected to the reinforcing floor(s) by bonding or lamination.

In other embodiments, an extent of the trailing edge in the direction towards the leading edge may be made solid or, due to manufacturing considerations, embodiments may comprise a cavity between the lower and upper shell parts and a plate fastened between the two parts some extent from the trailing edge. The cavity may be filled with lightweight material such as foam. Thereby, it may not be possible to fasten the reinforcing floor directly to the trailing edge, but instead to a part of the shell as near the trailing edge as possible. By connecting the reinforcing floor to a part of the shell near the trailing edge, instead of directly to the trailing edge, one can still obtain the advantages discussed above.

In an embodiment a single reinforcing floor may be connected to both the trailing and leading edges and to the internal girder. The internal girder may comprise one or more divided or cut webs that are connected to the reinforcing floor by bonding or lamination. In embodiments the at least one internal girder or web is a box profile. The reinforcing floor may then be provided between the trailing and/or leading edge(s) of the blade and the side of the box profile closest to the respective edge. The box profile may be formed by two girders or webs along with sections of the shell or it may be a total individual box profile.

In an embodiment the reinforcing floor may comprise a plate shaped element. The plate element may be solid or hollow or any suitable combination thereof. The thickness of the plate may vary along different sections of the plate or it may be substantially equally thick over its entire area. However, it is required that the plate element is able to take up in-plane compression forces in the floor and the material and the dimensions of the floor must have this capability. The material may preferably, but not exclusively, be a fibre reinforced plastic material or another material such as metal, metal alloy, wood, plywood, veneer, glass fibre, carbon fibre and other suitable materials such as e.g. one or more composite materials. The reinforced plastic material may be manufactured from materials such as, but not limited to glass fibres, carbon fibres or aramid fibres thus providing a high strength and a low weight.

The mentioned materials may also be combined to any construction. Thus, in another embodiment the at least one reinforcing element is a laminate or a sandwich construction having relatively hard/durable outer surfaces, such as a fibre reinforced plastic, and an inner core of another material, such as, but not limited to, a softer and/or lighter material such as a foamed material.

Additionally, the plate element may comprise one or more stiffeners for e.g. maintaining strength and stiffness while minimising the weight of the construction. The stiffeners may comprise any suitable shape and material such as rods or bars or lattices of a fibre reinforced plastic material or another light-weight material such as aluminium.

Furthermore, in embodiments the plate element may comprise one or more cut-outs in order to reduce weight and/or increase the stiffness of the plate element. The cut-outs may be provided in any suitable pattern.

By connecting or coupling the trailing edge with the closest web using a reinforcing floor that can withstand compression forces, the deformations in the shell between the trailing edge and the web are reduced since the greater part of the forces causing the deformations are taken up by and distributed through the reinforcing floor and the web. This will decrease the potentially damaging forces in the joint between the shell parts, as the forces are distributed towards the floor and the web.

As deformations are reduced, the shell is kept in its original shape or position to a much higher degree. The result is that the "ineffective" panels of the shell carry an increased part of the load on the blade, and thereby decrease the load taken up by other parts of the blade. This results in an increased stiffness of the blade in the flapwise direction and thereby decreases the tip deflection. Along with this, the aerodynamic efficiency of the blade is increased since the blade profile will remain closer to its originally designed shape.

The coupling will also increase the resistance of the trailing edge against buckling due to the edgewise loads because the damaging forces are distributed to the web through the floor.

As a result, the joint between the shell parts in the trailing edge is less exposed to damaging peeling and shear forces and the weight of the blade can be reduced since a less strong construction of the blade is needed. The lower weight reduces the dynamic inertia loads originating from the operation of the blade on the other parts of the wind turbine structure. Furthermore the aerodynamic efficiency of the blade is increased.

The reinforcing floor have a substantial desirable effect on the edgewise stiffness of the blade. As presented above, it prevents the deformation of the shell, which in itself has a positive effect on the edgewise stiffness, but it will also carry some of the edgewise loads. This will take load off of other parts of the blade which means the edgewise stiffness is increased substantially. Such increased edgewise stiffness provides a higher edgewise eigenfrequency. It is an advantage to have a higher edgewise eigenfrequency because it decreases the dynamic inertia loads the blade is applying on the other structure of the wind turbine, because an increase of the eigenfrequency reduces the amplitude of the harmonic oscillations of the blade.

The floor also reduces the transverse shear force distortion of the profile of the blade, and this increases the blade's capability of taking up crushing pressure. This again helps maintaining the blade profile closer to its original shape and thus potentially increases the power output from the turbine.

By connecting or coupling the leading edge with the closest web using a reinforcing floor that can withstand compression forces, the loads on the leading edge are distributed towards the floor and the web, thereby reducing the potentially damaging forces in the joint between the shell parts. The reinforcing floor stabilises the shell in and in the vicinity of the leading edge section and increases the resistance of the shell against buckling in the leading edge section. When the buckling resistance is increased, the thickness of the laminated material used for shell can be reduced or, in embodiments where a sandwich construction is provided, the thickness of the core can be reduced. In embodiments the use of a sandwich construction in the leading edge section of the shell can be completely omitted and instead a single kind of material may be used for the leading edge. As a result, the weight of the blade can be further reduced without compromising strength and stiffness, a more simple construction of the blade is provided and consequently the blade can be produced at a lower total price.

As a result of the flapwise load, crushing pressure and shear forces is generated in the webs. These forces can cause the web to collapse, because the web buckles out of the plane of the web. When the web buckles due to the crushing pressure, the whole side of the web bends outwards in one direction. The buckling due to shear forces in the web shows a distinct wave pattern bending outwards to one side in one part of the web and to the other side in a neighbouring part of the web. When a reinforcing floor is connected to a web (either the web towards the trailing edge or the web towards the leading edge, in case two webs are used), it supports the part of the web that tries to buckle, and this increases the resistance of the web to buckling, and therefore a thinner core is needed in the sandwich construction in the web. This will allow for a reduction of the weight of the blade, and a reduction of material costs.

In the lower part of the blade, it comprises a transition from a wide aerodynamic profile to a cylindrical root section. The root is the part of the blade that is mounted on the wind turbine axle. In this part of blade, a reinforcing floor in the trailing edge is a very efficient structure for transfer of stresses from the blade shell to the circular cylindrical root. Thereby the stresses in the trailing edge section in the part of the blade proximal to the root are significantly reduced and the risk of failure in the connection between the shell parts in the trailing edge of the blade are minimised.

Furthermore, a connection or coupling of both the trailing and the leading edges with the web will increase the torsional stiffness of the blade. This will increase the torsional eigenfrequency of the blade and in return decrease the dynamic inertia loads the blade is applying on the other structure of the wind turbine, because an increase of the torsional eigenfrequency reduces the amplitude of the harmonic oscillations of the blade.

In embodiments, the floor(s) used in the connection or coupling between the trailing and/or leading edge(s) and the web may be specially tailored so that the bending and torsion of the blade is coupled. This is used to take the load of the blade when strong wind gusts occur. This leads to lower fatigue loads on the blade and also facilitate a higher energy output of the wind turbine.

Figure 3:
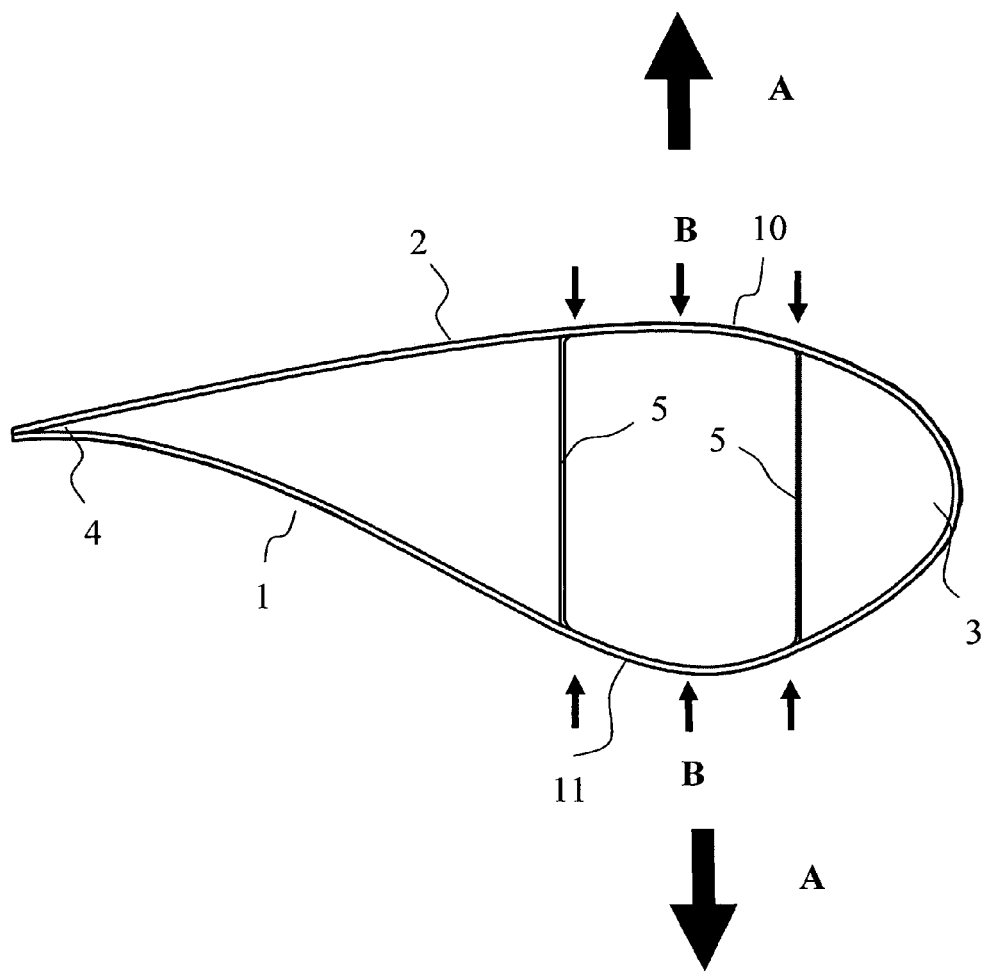
Figure 4:
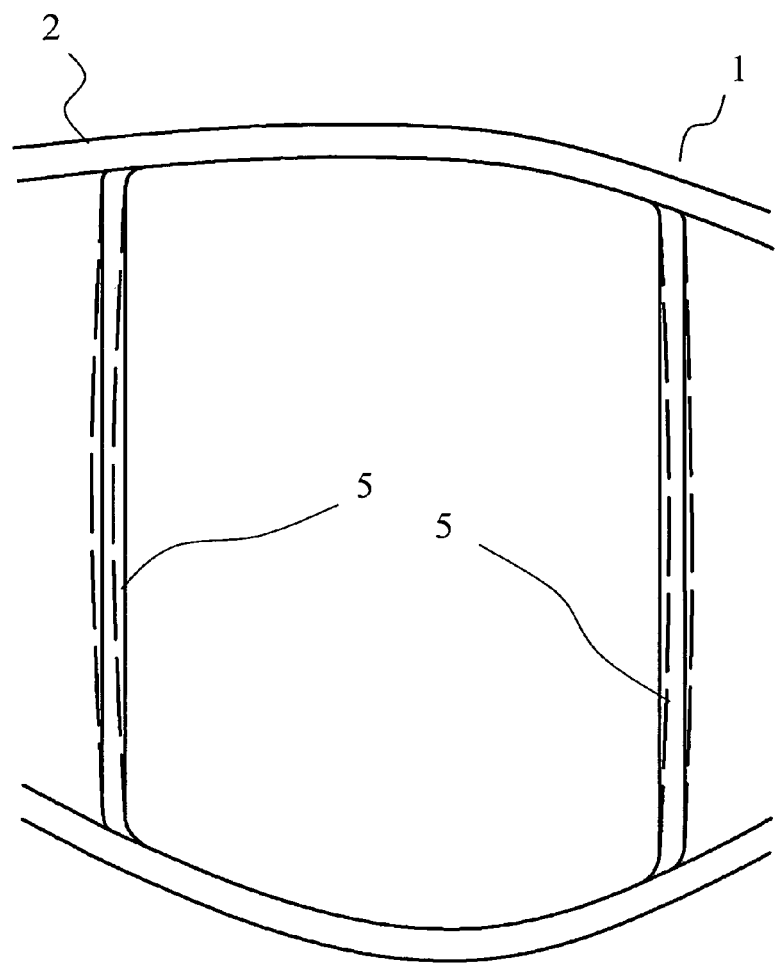
Figure 5A:
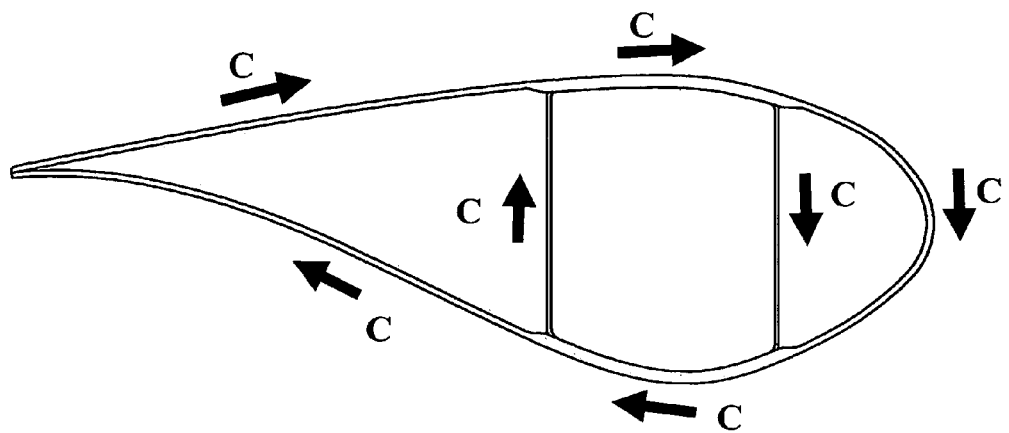
Figure 5B:
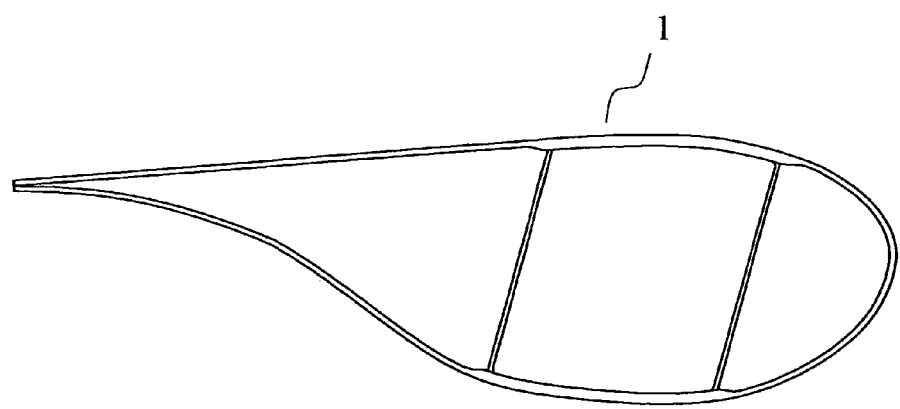
Figure 6:
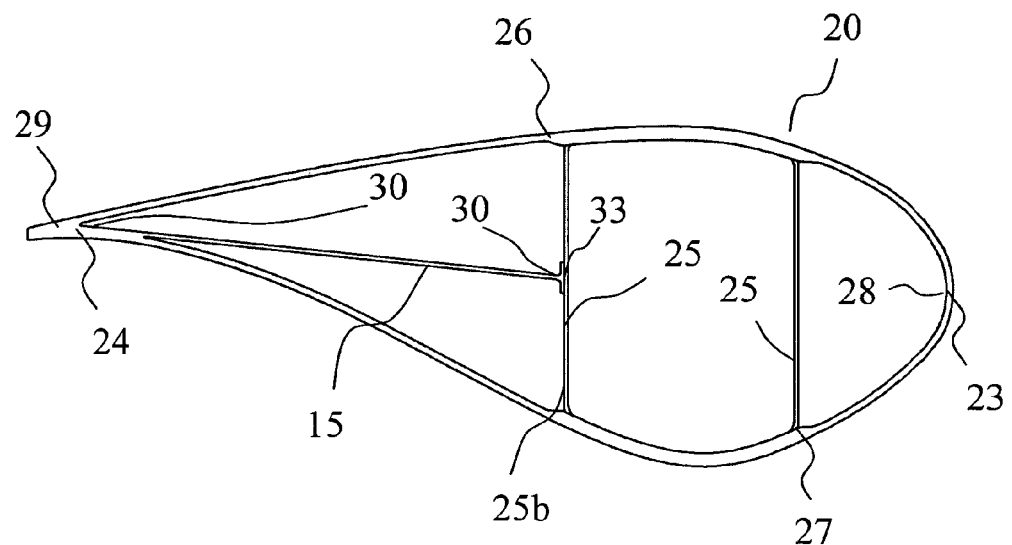
Figure 7:
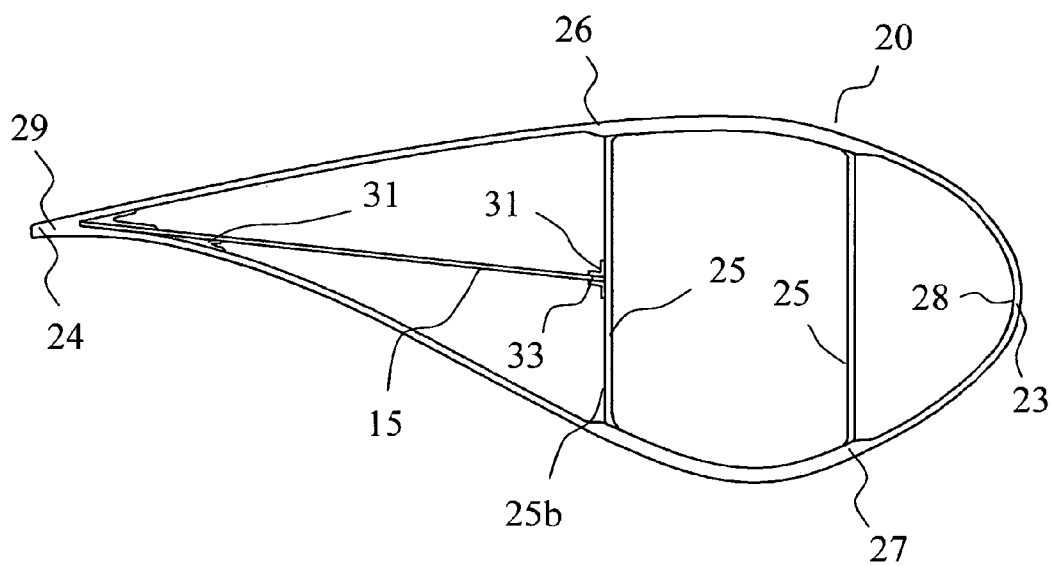
Figure 8:
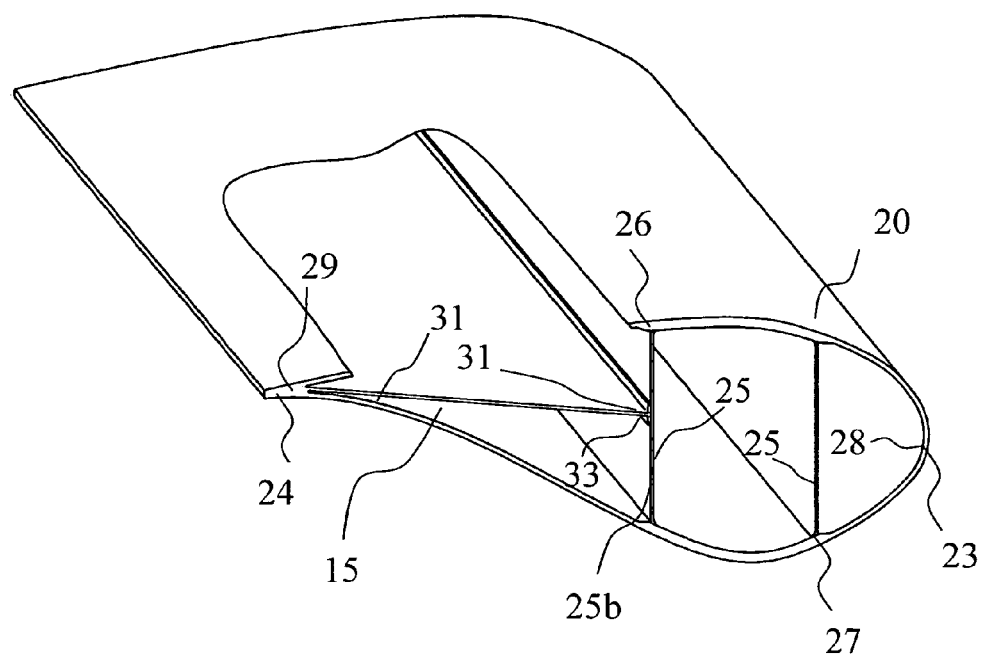
Figure 9:
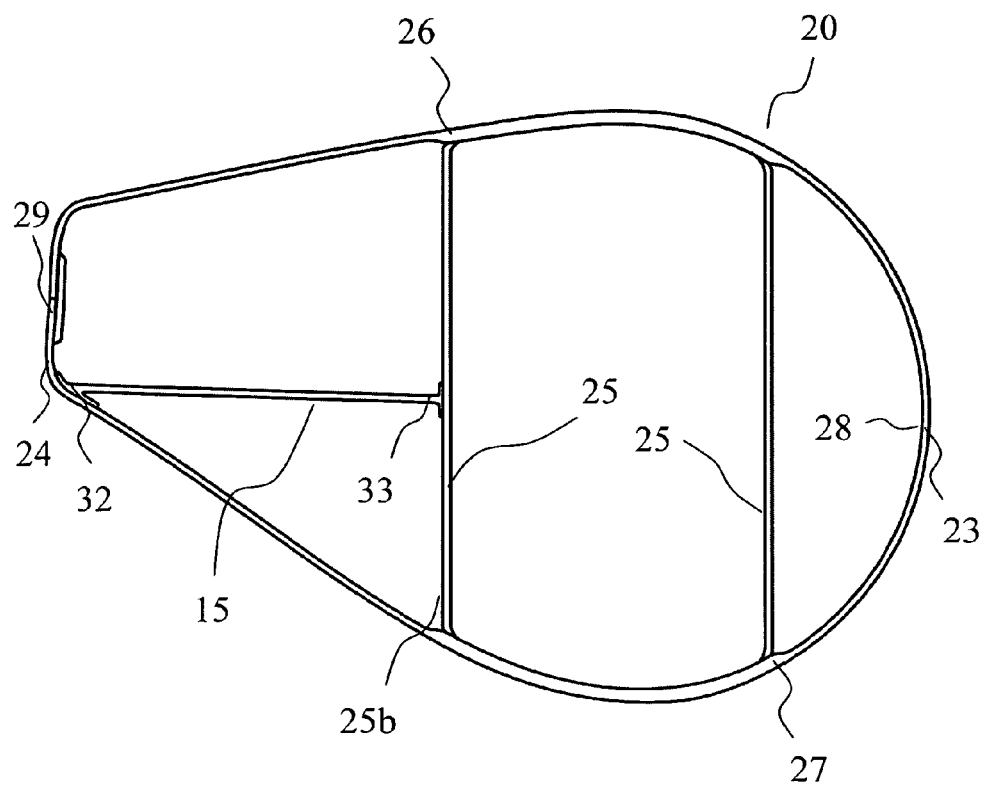
Figure 10:
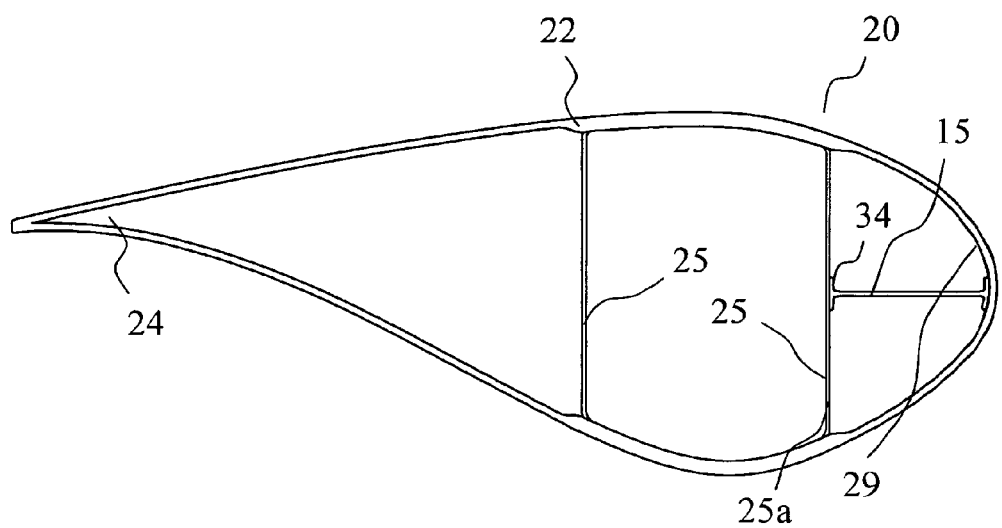
Figure 11:
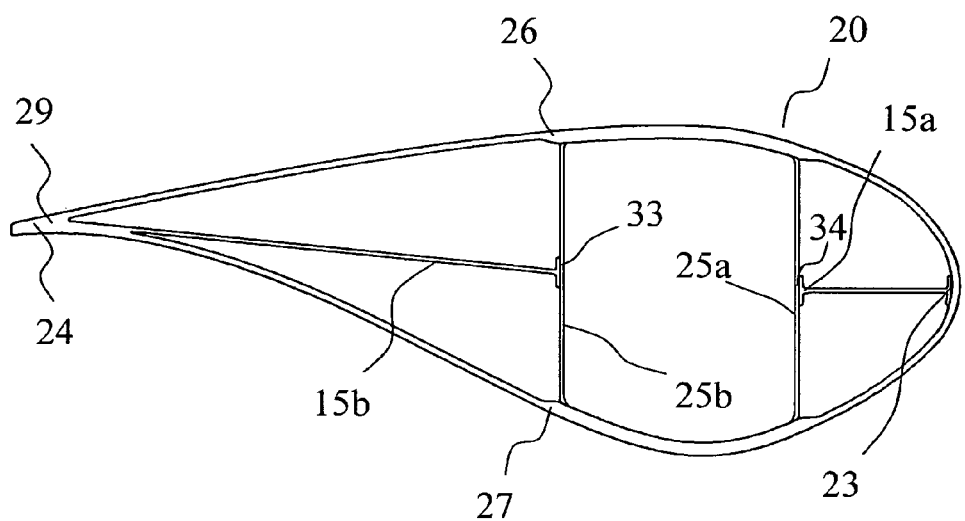
Figure 12:
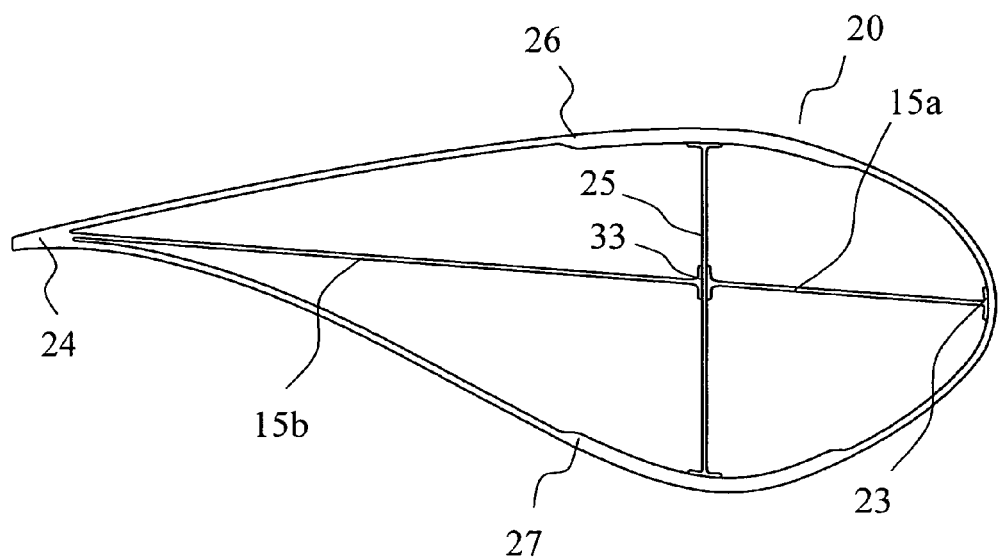
Figure 13:
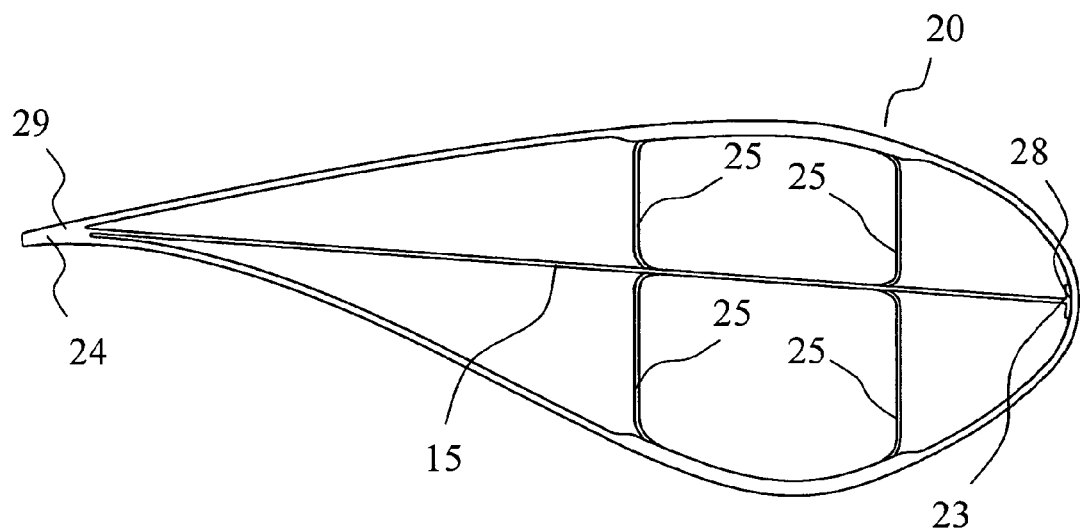
Figure 14:
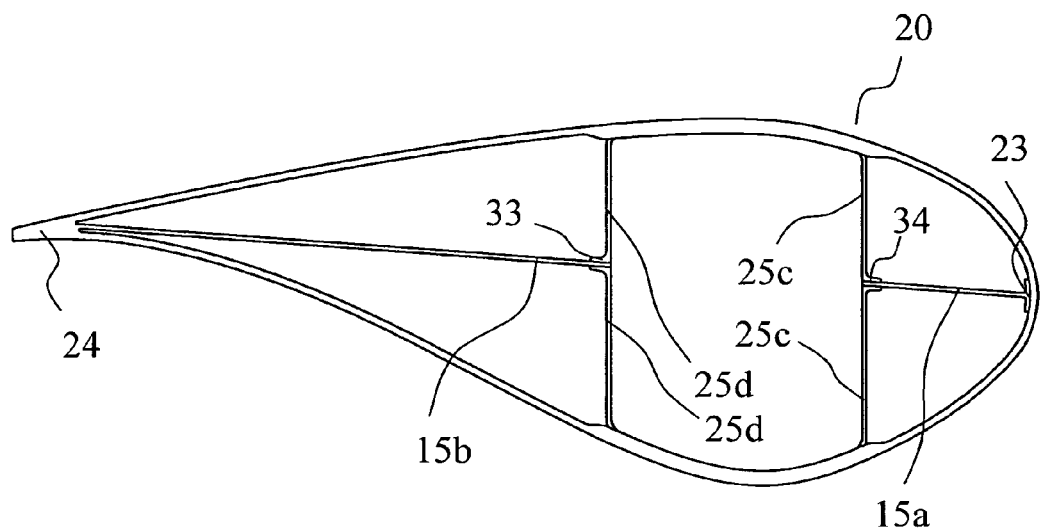
Figure 15:
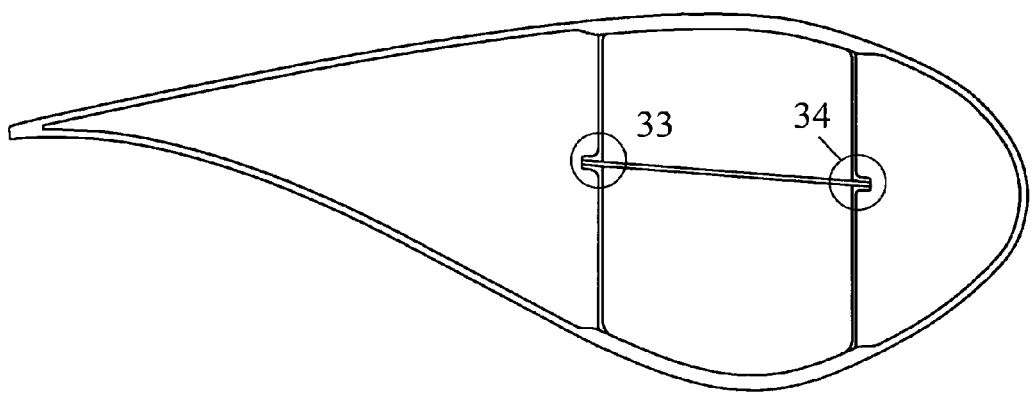
Figure 16:
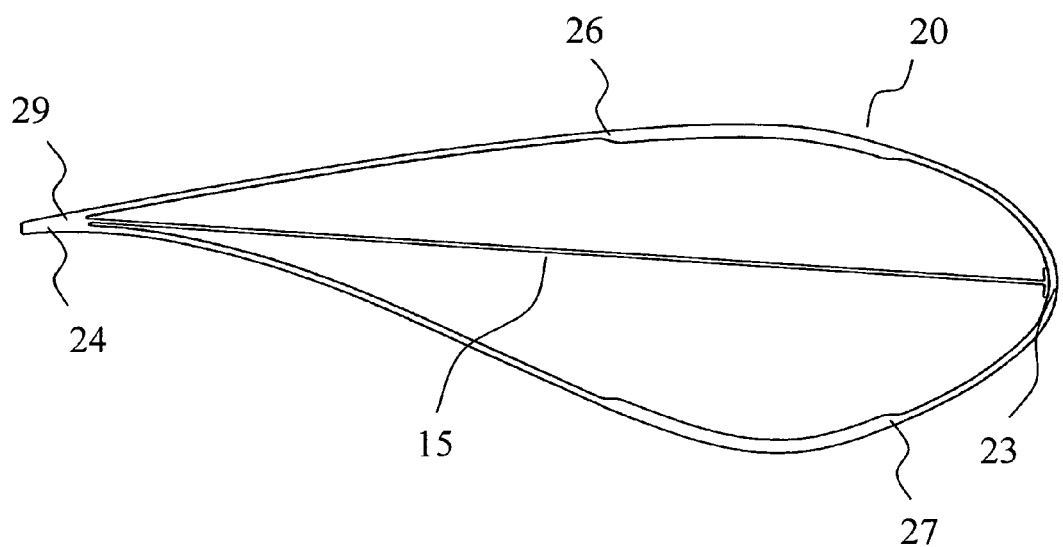
Figure 17:
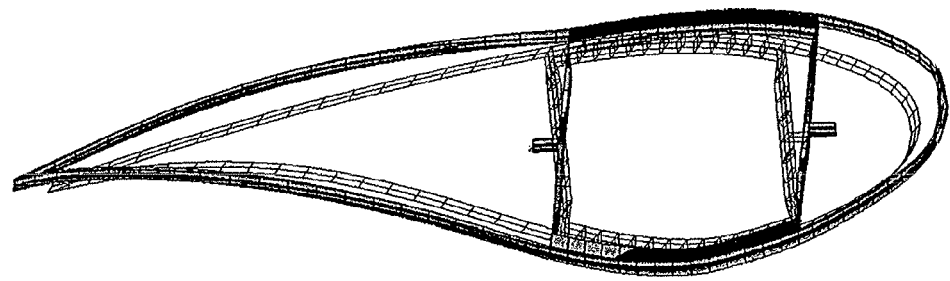
Figure 18:
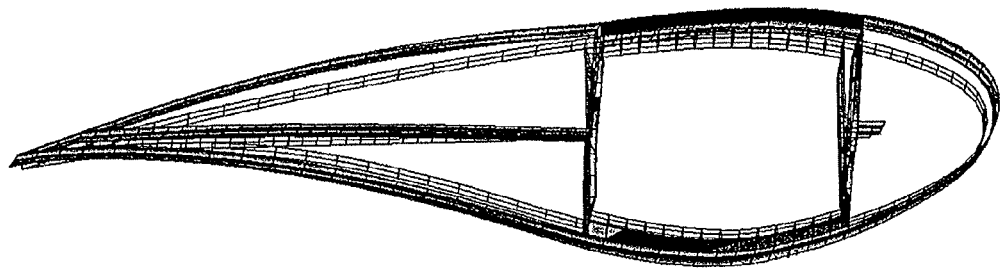
Figure 19:
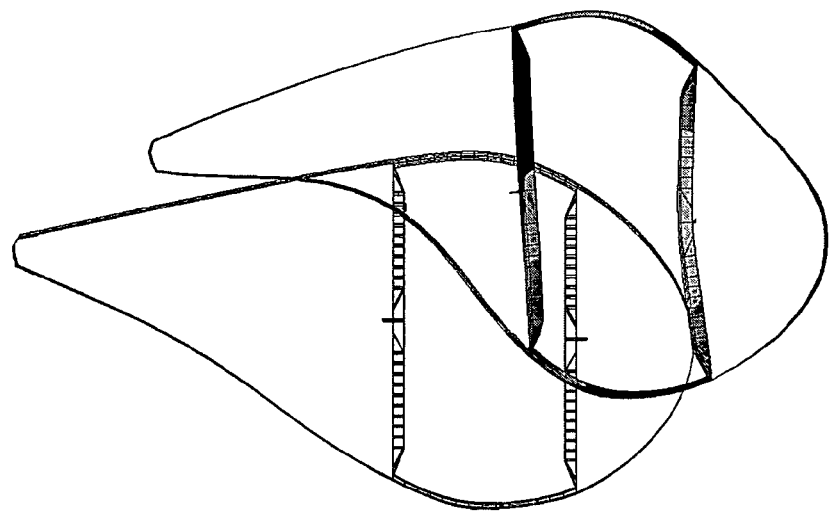
Figure 20:
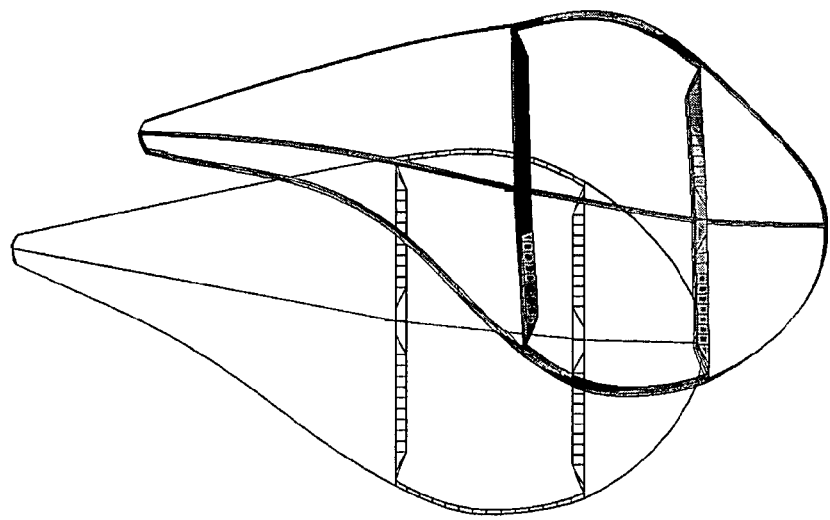

Below the invention will be described in more detail with reference to the exemplary embodiments illustrated in the drawings, wherein FIG. 1 is a schematic view of a cross-section of a wind turbine blade indicating a deformation of the blade shell (or panel) between a trailing edge and an internal girder/web due to flapwise loads, FIG. 2 is a schematic perspective view of a wind turbine blade indicating a deformation in a trailing edge of the blade in the form of a buckling pattern caused by an edgewise load that is also indicated, FIG. 3 is a schematic view of a cross-section of a wind turbine blade indicating the crushing pressure on the blade from the bending moment acting on the blade in operation, FIG. 4 is a schematic view of part of the cross-section of a wind turbine blade, in particular showing a web in the form of a box profile and indicating the potential deformation (ovalization) caused by the crushing pressure (deformed state shown as punctured lines), FIG. 5 is a schematic perspective view of a wind turbine blade indicating deformations caused by the influence of transverse shear forces on the blade profile, FIG. 6 is a schematic cross-sectional view of a reinforced wind turbine blade according to the invention showing the blade with two webs and a reinforcing floor extending from a trailing edge section to the closest web and connected by bonding, FIG. 7 is a schematic cross-sectional view of a reinforced wind turbine blade according to the invention showing the blade with two webs and a reinforcing floor extending from a position in the vicinity (near) of the trailing edge to the closest web and connected by laminating, FIG. 8 is a perspective view of the embodiment shown in FIG. 7, FIG. 9 is a schematic cross-sectional view at the root of the embodiment also shown in FIGS. 7 and 8, FIG. 10 is a schematic cross-sectional view of a reinforced wind turbine blade according to the invention showing the blade with two webs and a reinforcing floor extending from a leading edge to the closest web, FIG. 11 is a schematic cross-sectional view of a reinforced wind turbine blade according to the invention showing the blade with two webs and two reinforcing floors, one extending from a trailing edge and one extending from a leading edge to their respective closest web, FIG. 12 is a schematic cross-sectional view of a reinforced wind turbine blade according to the invention showing the blade with one web and two reinforcing floors, one extending from a trailing edge and one extending from a leading edge to each side of the web, FIG. 13 is a schematic cross-sectional view of a reinforced wind turbine blade according to the invention showing the blade with two webs which are each divided in two and a single reinforcing floor extending from a trailing edge to a leading edge of the blade, FIG. 14 is a schematic cross-sectional view of a reinforced wind turbine blade according to the invention showing the blade with two webs and two reinforcing floors, one extending from a trailing edge and one extending from a leading edge to each of the webs, FIG. 15 is a schematic cross-sectional view of a reinforced wind turbine blade according to the invention showing the blade with two webs and one reinforcing floor extending between the two webs, FIG. 16 is a schematic cross-sectional view of a reinforced wind turbine blade according to the invention showing the blade with no webs and one reinforcing floor extending from a trailing edge to a leading edge, FIG. 17 shows the deformation of a conventional wind turbine blade at a sector near the middle of the blade, FIG. 18 shows the deformation of a wind turbine blade according to the invention at a sector near the middle of the blade, FIG. 19 shows the deformation of a conventional wind turbine blade at a sector near the root of the blade, and FIG. 20 shows the deformation of a wind turbine blade according to the invention at a sector near the root of the blade.

The present invention will now be described more fully hereinafter with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. The figures are schematic and simplified for clarity, and they merely show details which are essential to the understanding of the invention, while other details have been left out. Throughout, the same reference numerals are used for identical or corresponding parts.

FIG. 1 shows a cross-section of a wind turbine blade 1 indicating (by punctured line) a deformation of the blade shell (or panel) 2 between a trailing edge 4 and an internal girder/web 5 due to flapwise loads originating from the aerodynamic and inertia forces on the blade in operation. The flapwise direction is illustrated by arrow A in FIG. 3. The shell 2 shown in this embodiment comprises two shell parts, designated in this example as upper part 6 and lower part 7. The upper and lower shell parts are connected by bonding in joints 8 and 9

(not indicated), preferably in or close to the leading and trailing edges 3 and 4 respectively, of the blade.

FIG. 2 shows a perspective view of a wind turbine blade 1 indicating a deformation (drawn exaggerated for the purpose of clarity) in the trailing edge 4 of the blade in the form of a buckling pattern caused by an edgewise load indicated by arrow F.

FIG. 3 shows a principle cross-section of a wind turbine blade 1 having a shell 2 with leading edge 3 and trailing edge 4. Also indicated is a box profile "composed by" two webs 5 and sections 10 and 11 of the shell 2 located between the webs. The aerodynamic and inertia forces working on a blade in operation induce a bending moment on the blade and create a crushing pressure indicated by arrows B. The crushing pressure is also referred to as the Brazier effect (reference is made to the article "Structural testing and numerical simulation of a 34 m composite wind turbine blade" by F. M. Jensen et. al. published by Elsevier in Composite Structures 76 (2006) 52-61). The flapwise direction is illustrated by arrow A.

FIG. 4 shows a schematic partial view of a cross-section of the blade 1. The blade is shown in a loaded or ovalized state, indicated by the punctured line. The figure also indicates a cross-section of the blade in a neutral or un-loaded position (fully drawn line). The figure is intended to support the understanding of how the forces on the blade cause its cross-sectional profile/shape to vary. The repeated exposure to ovalization adds to fatiguing the blade structure over time.

FIG. 5 is divided into two schematic, perspective views of a wind turbine blade 1. FIG. 5a indicates the transverse shear forces (arrows C) on the blade profile and FIG. 5b indicates in principle the resulting deformed blade profile from the influence of the transverse shear forces. The blade 1 is illustrated as being "twisted clockwise" by the transverse forces.

FIG. 6 shows a cross-section of a reinforced wind turbine blade 20 according to the invention where the blade 20 has two webs 25. Along with the shell 22, the girders form a box profile. The top and bottom of the box profile are often referred to as the caps. The caps follow the aerodynamic curved shape of the shell 22 and therefore have a transverse curvature. The caps are reinforced. Elsewhere, the aerodynamic shell is typically only a thin skin or a laminate such as a sandwich construction with thin skins and a core material.

Further, the blade 20 has a reinforcing floor 15 extending from the trailing edge 24 to the closest of the webs 25b. In the illustrated embodiment, the blade shell 22 has an upper part 26 and a lower part 27. The parts are connected to each other by bonding with suitable bonding means in connection joints 28 and 29 in or in the vicinity (near or proximal to) of the leading edge 23 and the trailing edge 24, respectively. In the illustrated embodiment, the floor 15 is connected to the trailing edge section 24 and the web 25b by means of bonding 30, and preferably, the connection 33 of the floor 15 to the web 25b is located substantially halfway between the upper part 26 and lower part 27 of the shell 22 for maximum reinforcement of the blade 20.

FIG. 7 shows a cross-section of a reinforced wind turbine blade 20 according to the invention where the blade 20 has two webs 25 and a reinforcing floor 15 extending from a position on the inner surface of the blade shell 22 in vicinity of the trailing edge 24 and to the closest of the webs 25b. In the illustrated embodiment, the blade shell 22 has an upper part 26 and a lower part 27. The upper and lower parts 26, 27 are connected to each other by bonding with suitable bonding means in connection joints 28 and 29 in or in the vicinity (near or proximal to) of the leading edge 23 and the trailing edge 24, respectively. In this particular figure, the floor 15 is connected to a lower part 27 of the shell 22 in the vicinity of the trailing edge section 24 and to the web 25b by laminating means 31, and preferably, the connection 33 of the floor 15 to the web 25b is located substantially halfway between the upper part 26 and lower part 27 of the shell 22 for maximum reinforcement of the blade 20.

Any suitable connection means or methods between the reinforcing floor 15 and the web 25, between the reinforcing floor 15 and the inner surface of the shell 22 or between the web 25 and the inner surface of the shell 22 may of course be applied in any one of the embodiments described in this application, especially, but not exclusively, bonding, laminating and mechanical means.

FIG. 8 shows the embodiment of FIG. 7 in perspective. For all embodiments, the floor may extend along substantially the entire longitudinal extension of the blade 20 or along substantially the entire longitudinal extension of the girder or web 25 or, the floor may extend along a part of the longitudinal extension of the blade. Further, the floor may be divided into a number of sections in the longitudinal direction of the blade. The reinforcing effect of the floor tends to increase towards the root of the blade 20 and decrease towards the tip of the blade 20.

FIG. 9 shows the cross-section of the blade 20 of FIGS. 7 and 8 at the root of the blade 20. It should be noted that the connection point 32 of the floor 15 to the lower part 27 of the shell 22 at the trailing edge 24 is located below the connection joint 29 of the upper part 26 of the shell 22 in a position of minimum distance from the trailing edge 24 to the connection 33 of the floor 15 to the web 25b for maximum reinforcement of the blade 20.

FIG. 10 shows a cross-section of another embodiment of a wind turbine blade 20 according to the invention comprising two webs 25 and a reinforcing floor 15 extending from the leading edge 23 to the closest of the webs 25. The section 29 of the blade shell 22 forming the leading edge 23 is thereby reinforced so that it is considerably thinner than in existing wind turbine blades, thereby reducing weight of the blade 20. Preferably, the connection 34 of the floor 15 to the web 25a is located substantially halfway between the upper part 26 and lower part 27 of the shell 22 for maximum reinforcement of the blade 20.

FIG. 11 shows a cross-section of yet another embodiment of a wind turbine blade 20 according to the invention comprising two webs 25 and two reinforcing floors 15a, 15b. A first reinforcing floor 15a is provided between the leading edge 23 and the web 25a closest thereto and a second reinforcing floor 15b is provided between the trailing edge 24 and the web 25b closest thereto. The reinforcing floor 15b may in embodiments be connected to the trailing edge section 24 in the connection joint 29 between the upper and lower shell 22 parts. In such an embodiment the three parts 26, 27 and 15b are bonded together. In other embodiments the reinforcing floor 15b is connected to either the upper par 26 or preferably the lower part 27 of the shell 22 in the vicinity (near or proximal to) of the trailing edge section 24. Preferably, the connection 34 of the floor 15a to the web 25a is located substantially halfway between the upper part 26 and lower part 27 of the shell 22 for maximum reinforcement of the blade 20; and preferably, the connection 33 of the floor 15b to the web 25b is located substantially halfway between the upper part 26 and lower part 27 of the shell 22 for maximum reinforcement of the blade 20.

FIG. 12 shows a cross-section of an embodiment in which the wind turbine blade 20 comprises a single web 25 and two reinforcing floors 15a, 15b. A first reinforcing floor 15a extends from a position on the inner surface of the shell 22 in the vicinity of the leading edge 23 to a first side of the web 25 and a second reinforcing floor 15b extends from a position on the inner surface of the shell 22 in, or in the vicinity of, the trailing edge 24 to a second side of the web 25. Preferably, the connection 34 of the floor 15a to the web 25 is located substantially halfway between the upper part 26 and lower part 27 of the shell 22 for maximum reinforcement of the blade 20; and preferably, the connection 33 of the floor 15b to the web 25 is located substantially halfway between the upper part 26 and lower part 27 of the shell 22 for maximum reinforcement of the blade 20.

FIG. 13 shows another cross-sectional view of an embodiment of a wind turbine blade 20 comprising two webs 25 and a single reinforcing floor 15 extending from a position in the vicinity of the connection joint 28 in the leading edge section 23 to a position in the vicinity of the connection joint 29 in the trailing edge section 24 of the blade 20. The webs 25 are divided in two and abut the reinforcing floor 15 on both sides thereof.

FIG. 14 shows yet another example of a cross-section of an embodiment in which the wind turbine blade 20 comprises two webs 25 divided in two (25c and 25d) and further two reinforcing floors 15a and 15b. A first reinforcing floor 15a extends from a position on the inner surface of the shell 22 in the vicinity of the leading edge 23 to the webs 25c and a second reinforcing floor 15b extends from a position on the inner surface of the shell 22 in, or in the vicinity of, the trailing edge 24 to the webs 25d. Preferably, the floors 15a, 15b extend along substantially coinciding planar surfaces.

FIG. 15 is a schematic cross-sectional view of a reinforced wind turbine blade 20 according to the invention with two webs 25a, 25b and one reinforcing floor 15 extending between the two webs 25a, 25b. Preferably, the connection 34 of the floor 15a to the web 25 is located substantially halfway between the upper part 26 and lower part 27 of the shell 22 for maximum reinforcement of the blade 20; and preferably, the connection 33 of the floor 15b to the web 25 is located substantially halfway between the upper part 26 and lower part 27 of the shell 22 for maximum reinforcement of the blade 20. The reinforcing floor 15 may also extend along a plane interconnecting the trailing edge 24 and leading edge 23 of the blade 20.

A force in the flapwise direction applied to the caps between the two webs 25 urges the caps towards the inner volume of the shell 22 and also urges the two connections 33, 34 away from each other. However, the reinforcing floor keeps the two connections 33, 34 in substantially mutually fixed positions and thus prevents the distance between the connections 33, 34 from increasing or decreasing thereby strengthening the blade 20 against forces in the flapwise direction. Thus, the reinforcing floor 15 desirably has a high stiffness.

In an embodiment wherein a flapwise force would increase the distance between the connections 33, 34, the floor 15 desirably has a high tensional strength while the reinforcing floor 15 need not be capable of resisting compression forces. Preferably, the reinforcing floor 15 has a straight shape, such as the shape of a rod or a stretched wire or a planar member. In the event that the shape of the reinforcing element is not straight, the shape of the reinforcing element could be straightened when subjected to stretching forces leading to movement of its end points and obviously, this is not desired.

The at least one reinforcing element may comprise a bar or a rod-like element. The element may be solid or hollow or any suitable combination thereof. Alternatively, the at least one reinforcing element may comprise wire, rope, cord, thread or fibres. They may be applied individually or may be applied as a number of individual elements together forming a "thicker" element. Particularly, the element may comprise fibres of very high stiffness and strength such as, but not limited to, aramid fibres.

Further, the at least one reinforcing element may comprise a plate. The plate element may be solid or hollow or any suitable combination thereof. The plate material may comprise any of metal, metal alloy, wood, plywood, veneer, glass fibre, carbon fibre and other suitable materials such as e.g. one or more composite materials. The element may further be provided as netting or a web comprising one or more of wire, rope, cord, thread or fibres. The plate element may alternatively comprise a textile or a fabric material. The fabric material may be manufactured from materials such as, but not limited to carbon fibres or aramid fibres thus providing a high strength and a low weight. If suitable, glass fibres may also be used.

The mentioned materials may also be combined to any construction. Thus, in another embodiment the at least one reinforcing element is a laminate or a sandwich construction.

In order to obtain a high resistance against flapwise forces, the reinforcing floor 15 also has a high strength against compression forces. In this case, the webs 25a, 25b and the reinforcing floor 15 cooperate to form an I-profile wherein the floor 15 forms the body of the I-profile. The formed I-profile has a high stiffness against bending forces applied in the edgewise direction of the blade 20.

An embodiment of the invention was analysed with respect to increased strength as compared to a conventional wind turbine blade using experimental substructure test performed on a part of the load carrying girder of a 34 m wind turbine blade designed for use on a 1.5 MW wind turbine.

The test is described in "Experimental and numerical analysis of a wind turbine blade cross section—Under lateral load conditions". Rune F. Nielsen. Student Report (special course)—Technical University of Denmark and Risø National Laboratory. (December 2006).

In this embodiment the invention prevents the webs of the girder to collapse from the crushing pressure induces by the aerodynamic and inertia forces working on a blade in operation.

The result showed an increase of more that 50% of the ultimate crushing pressure the web can withstand compared to a conventional box girder.

FIG. 16 shows a cross-section of still another embodiment of the invention in which the wind turbine blade 20 comprises a shell 22 without webs and with a reinforcing floor 15 extending from a position on the inner surface of the shell 22 in the vicinity of the trailing edge 24 to a position on the inner surface of the shell 22 in the vicinity of the leading edge 23. The reinforcing floor 15 has a high stiffness against bending forces applied in the edgewise direction of the blade 20. An embodiment of the invention was analysed with respect to increased strength as compared to a conventional wind turbine blade using numerical modelling of a 34 m wind turbine blade designed for use on a 1.5 MW wind turbine.

The numerical analysis included Finite Element analysis of a model containing more than 150 000 shell and 3D elements. Advanced software and algorithms were used in the analysis to account for the effect of nonlinear geometrical deformations.

The model of the blade has been verified with full-scale test of the blade ("Structural testing and numerical simulation of a 34 m composite wind turbine blade" by F. M. Jensen et. al. published by Elsevier in Composite Structures 76 (2006) 52-61). The blade was loaded in the edgewise direction with loads that were similar to the certification loads for the blade.

The combined loads in both the flapwise and edgewise direction were loads that should simulate to the operational loads for the blade.

The analysis showed a significant reduction of the deformation of the trailing edge section of the shell when the blade is equipped with the invention, in both edgewise loads and a combination of flapwise and edgewise loads. FIGS. 17 and 18 show the results of the analysis of a sector near the middle of the blade, and FIGS. 19 and 20 show the results of the analysis of a sector near the root of the blade.

The reduction of the deformation of the shell section reduces the peeling stresses in the trailing edge of the blade and therefore improves the reliability of the adhesive joint of the trailing edge Furthermore, the aerodynamic efficiency of the blade is also improved since the designed shape of the blade profile is maintained to a higher degree.

Furthermore the analysis showed a significant reduction of the distortion of the profile and this increase the blade's resistance to the crushing pressure and thereby increases the ultimate strength of the wind turbine blade.

Although the present invention has been described in connection with the specified embodiments it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A wind turbine blade, comprising:
   a shell having a section with an aerodynamic profile; and
   at least one plate shaped element connected inside the shell, the at least one plate shaped element increasing the strength of the blade and extending substantially along the profile chord of the blade.

2. A wind turbine blade according to claim 1, wherein the at least one plate shaped element is connected to an inner surface of the shell at one of the trailing edge and the leading edge of the blade.

3. A wind turbine blade according to claim 2, wherein the at least one plate shaped element is connected to the inner surface of the shell at the trailing edge of the blade.

4. A wind turbine blade according to claim 3, wherein:
   the shell has a cylindrical root section that mounts the blade on a wind turbine shaft; and
   the at least one plate shaped element is connected to the inner surface of the shell at the trailing edge along at least a part of the transition between the shell with the aerodynamic profile and the cylindrical root section.

5. A wind turbine blade according to claim 4, further comprising at least one internal girder, wherein the at least one plate shaped element is connected to the at least one internal girder and to the inner surface of the shell in the root section with a minimum distance between the connection at the trailing edge and the connection to the at least one girder.

6. A wind turbine blade according to claim 1, further comprising at least one internal girder, and wherein the at least one plate shaped element is connected to the at least one internal girder.

7. A wind turbine blade according to claim 6, wherein a connection between one of the at least one plate shaped element and a respective one of the at least one internal girder is located with a shortest distance to the shell that is larger than 0.16 times the total distance between the upper part of the shell and the lower part of the shell along a transversal extension of the respective girder comprising the connection.

8. A wind turbine blade according to claim 6, comprising a first and a second girder, and wherein one of the at least one plate shaped element is connected to the first and the second girder.

9. A wind turbine blade according to claim 1, wherein the at least one plate shaped element comprises a textile or a fabric material with high tensional strength without a capability of resisting compression forces.

10. A wind turbine blade according to claim 1, wherein at least a part of the plate shaped element is of a laminated construction.

11. A wind turbine blade according claim 1, wherein the plate shaped element comprises one or more stiffeners.

12. A wind turbine blade according to claim 1, wherein the plate shaped element is provided with one or more cut-outs.

13. A wind turbine blade according to claim 1, wherein the plate shaped element is planar.

14. A wind turbine blade according to claim 1, wherein the plate shaped element has a thickness that varies along different sections of the plate.

15. A method of increasing the strength of a wind turbine blade, the method comprising:
   providing a shell with a section having an aerodynamic profile; and
   positioning and connecting at least one plate shaped element inside the shell for extension substantially along the profile chord of the blade.

16. A method according to claim 15, wherein positioning and connecting includes connecting the at least one plate shaped element to the inner surface of the shell at the trailing edge of the blade.

17. A method according to claim 16, wherein the shell includes a cylindrical root section for mounting of the blade on a wind turbine shaft, and wherein the method further comprises connecting the at least one plate shaped element to the inner surface of the shell at the trailing edge along at least a part of the transition between the section of the shell with the aerodynamic profile and the root section.

18. A method according to claim 15, further comprising connecting the at least one plate shaped element to an internal girder.

19. A method according to claim 15, wherein positioning and connecting includes connecting the at least one plate shaped element to the inner surface of the shell at the leading edge of the blade.

20. A wind turbine blade, comprising:
   a shell having a section with an aerodynamic profile;
   at least one internal reinforcing floor connected inside the shell, the at least one internal reinforcing floor increasing the strength of the blade and having a cross section transversely to the longitudinal extension of the blade that extends substantially in a direction from the trailing edge to the leading edge of the blade; and
   at least one internal girder, wherein
   the at least one internal reinforcing floor is connected to the at least one internal girder, and
   a connection between one of the at least one internal reinforcing floor and a respective one of the at least one internal girder is located with a shortest distance to the shell that is larger than 0.16 times the total distance between the upper part of the shell and the lower part of the shell along a transversal extension of the respective girder comprising the connection.

* * * * *